Feb. 14, 1939.   G. E. PETERS ET AL   2,147,007
HORN RING FOR AUTOMOBILES
Filed Jan. 6, 1938   4 Sheets-Sheet 2
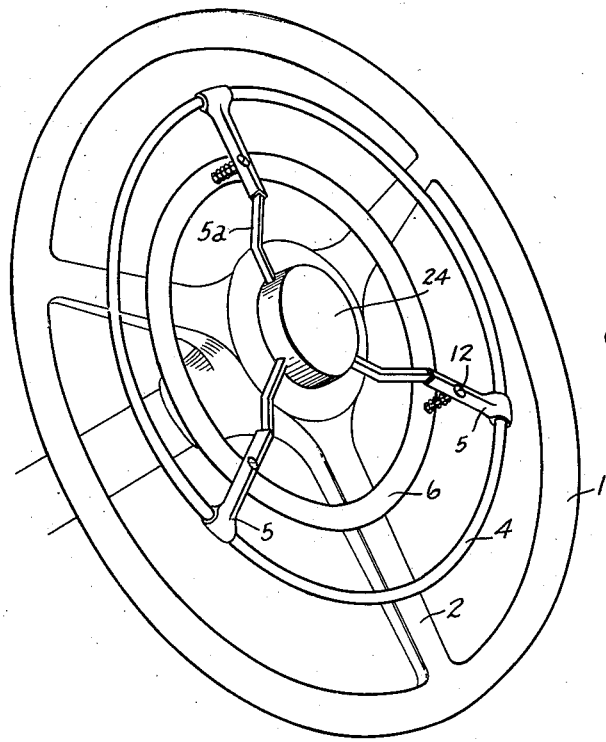
Fig.-6
Fig.-8
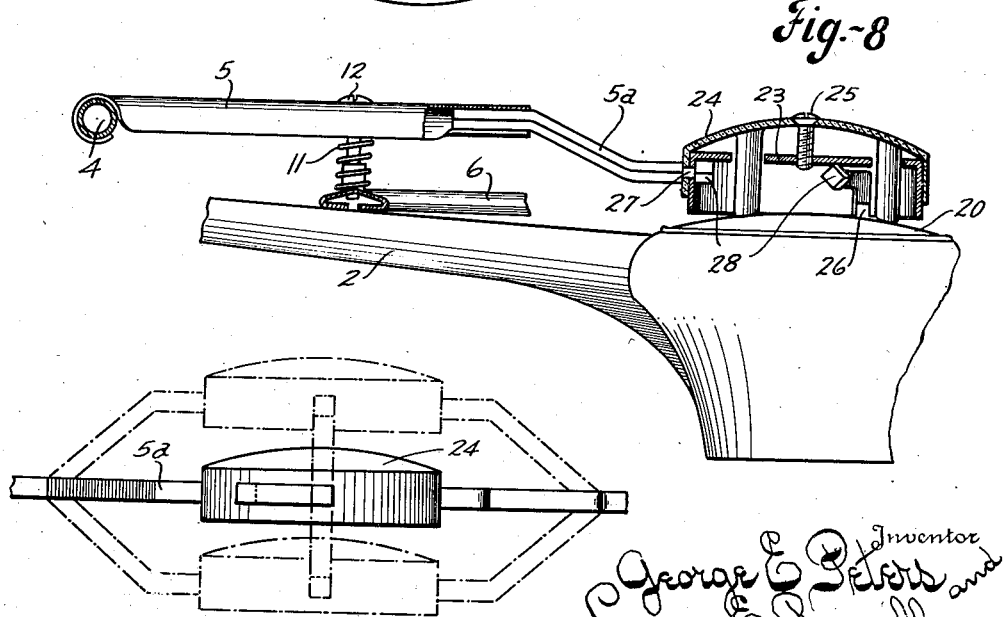
Fig.-7
Inventor
George E. Peters and
Linus E. Russell
By J. L. Walker
Attorney Feb. 14, 1939. G. E. PETERS ET AL 2,147,007
HORN RING FOR AUTOMOBILES
Filed Jan. 6, 1938 4 Sheets-Sheet 3
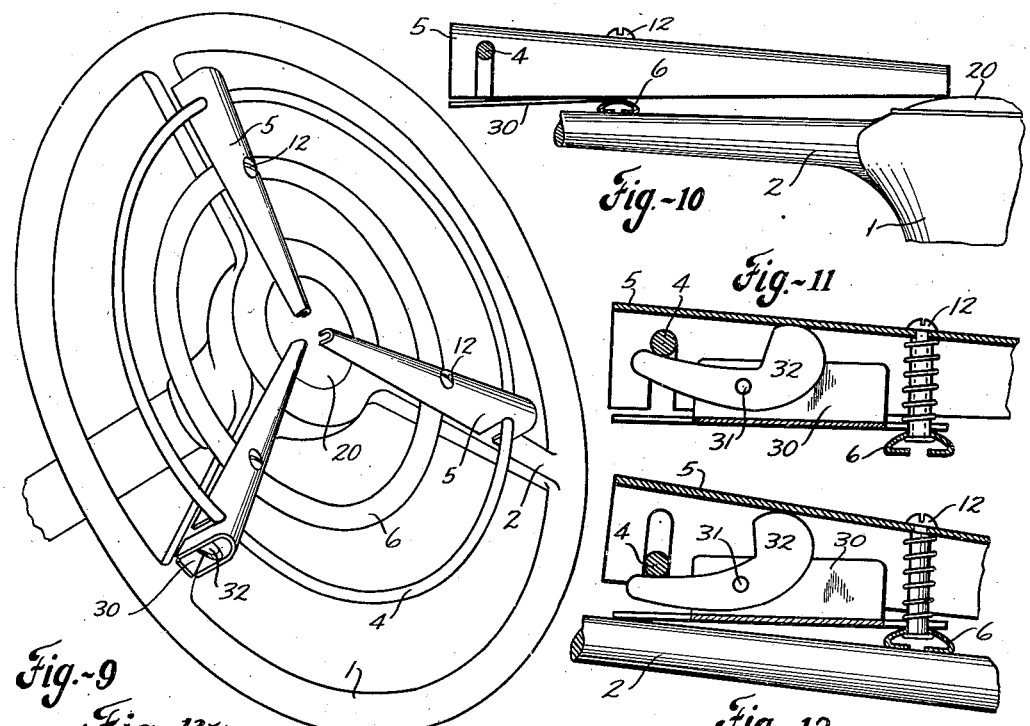
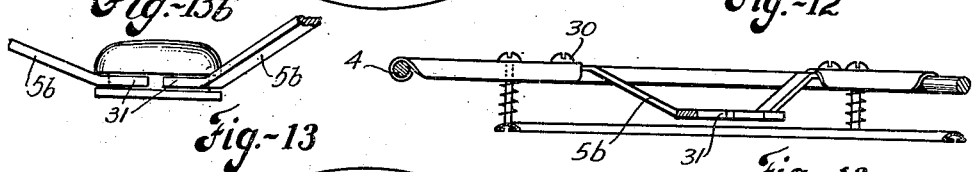
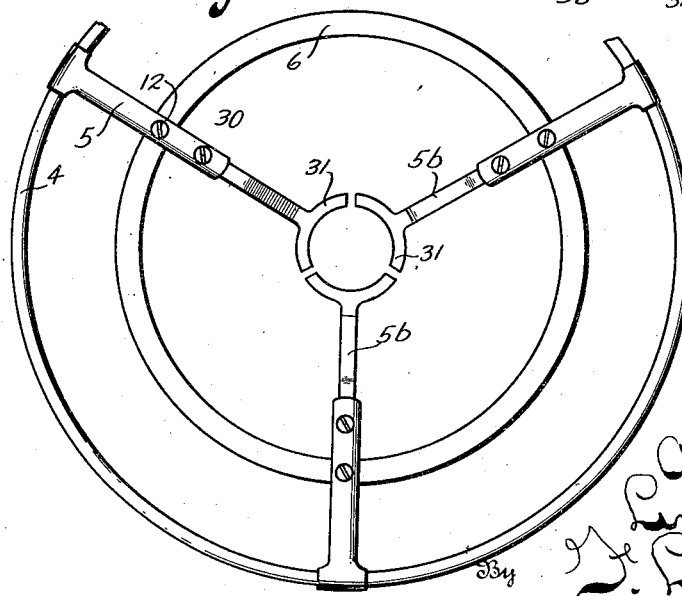

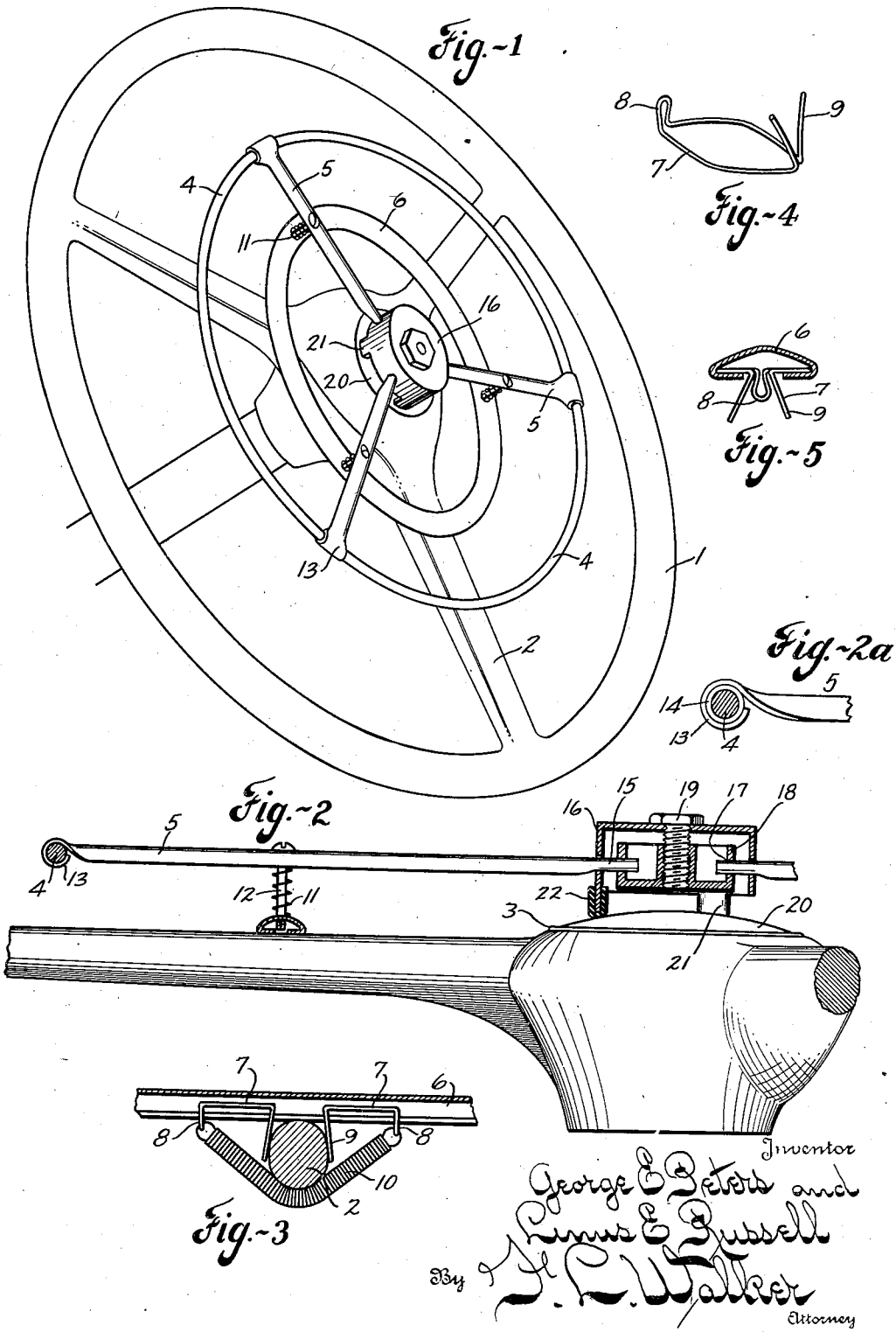

Feb. 14, 1939. G. E. PETERS ET AL 2,147,007
HORN RING FOR AUTOMOBILES
Filed Jan. 6, 1938 4 Sheets-Sheet 4

Inventor
George E. Peters
Linus E. Russell
By J. L. Walker
Attorney

Patented Feb. 14, 1939

2,147,007

UNITED STATES PATENT OFFICE 2,147,007

HORN RING FOR AUTOMOBILES

George E. Peters and Linus E. Russell, Springfield, Ohio, assignors to Peters and Russell, Inc., Springfield, Ohio, a corporation of Ohio Application January 6, 1938, Serial No. 183,686

23 Claims. (Cl. 74—484)

This invention pertains to signaling apparatus, and more particularly to a universal horn operating device for automobile steering wheels, for enabling the horn to be easily and conveniently operated from any position of the driver's hands without releasing his grasp of the steering wheel rim.

It is customary at the present time to mount the motor vehicle signal horn button concentrically upon the steering wheel. However, in an emergency when it is highly desirable and necessary that the operator retain complete control of his vehicle by maintaining his grasp of the wheel, it becomes necessary to relax his control of the steering wheel while he reaches for the horn button.

The present device is capable of universal application to steering wheels of various shapes and designs, by which the operator may conveniently operate the horn from any position upon the wheel rim while retaining complete control.

The object of the invention is to provide a horn button operator which may not only be economically manufactured but which will be quite efficient in use, uniform in its action, having relatively few operating parts and unlikely to get out of repair.

A further object of the invention is to provide a horn button operator which will be universal in its application to steering wheels of different shapes and designs, wherein the conventional horn button may be set either high or low relative to the plane of the wheel rim, and wherein the wheel spokes may be variously disposed or of different sizes and shapes.

A further object of the invention is to provide an improved resilient mounting for the operator device.

A further object of the invention is to provide for to and fro shifting, rotary and vertical adjustment of the operator mounting means to agree with various wheel designs.

A further object of the invention is to provide an operator device having reversible means adjustable to different positions for universally accommodating steering wheels having horn button placements in different planes relative to that of the wheel rim.

A further object of the invention is to provide improved means for transmitting operating pressure from the actuating ring to the operated button.

A further object of the invention is to provide a horn button operator means which may be easily and quickly installed by unskilled persons without the use of special tools.

A further object of the invention is to provide a horn button operator having the herein disclosed structural features of advantage and meritorious characteristics.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawings.

In the accompanying drawings, wherein is shown the preferred, but obviously not necessarily the only, forms of the invention, Fig. 1 is a perspective view of a conventional automobile steering wheel to which a horn button operator employing the present invention has been applied.

Fig. 2 is an enlarged detail sectional view.

Fig. 2a is a detailed view.

Fig. 3 is a transverse sectional view through one of the steering wheel spokes showing the mode of attaching the horn ring mounting thereto.

Fig. 4 is a perspective view of a spring coupling member for anchoring the attachment tie to the mounting ring.

Fig. 5 is a transverse sectional view through the ring showing the coupling device engaged therewith.

Fig. 6 is a perspective view of a modification of the invention applied to a conventional steering wheel.

Fig. 7 is a detail perspective view of a portion of the construction shown in Fig. 6, illustrating different adjusted relation of the parts.

Fig. 8 is an enlarged sectional view.

Fig. 9 is a perspective view illustrating a still further variant of the invention applied to a conventional steering wheel.

Fig. 10 is a fragmentary side elevation of a portion of the device illustrated in Fig. 9.

Figs. 11 and 12 are detail sectional views thereof showing the parts in normal and in operated relation.

Fig. 13 is a plan view, partly broken away, of a further variation of the invention.

Fig. 13a is a detail sectional view of a portion of the structure shown in Fig. 13. Fig. 13b is a detail view of a knob added to the structure of Fig. 13.

Fig. 14 is a detail sectional view of the construction illustrated in Figs. 9 to 12 inclusive.

Figure 15:
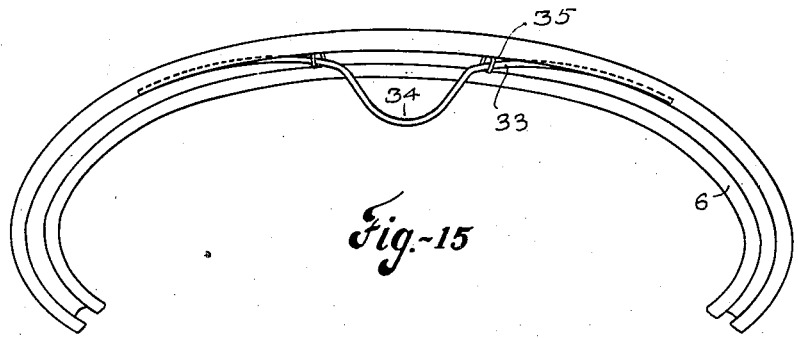
Figure 15A:
Figure 16:
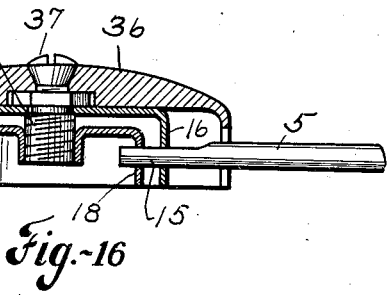
Figure 17:
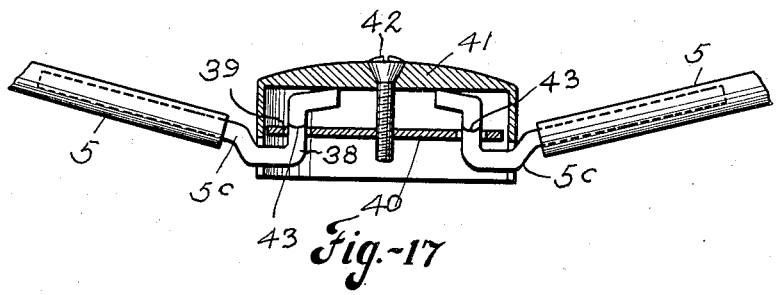

Fig. 15 is a detail perspective view of a portion of the mounting ring illustrating a modification of the attachment means. Fig. 15a is a perspective view of a keeper slide such as shown in Fig. 15, detached from the ring. Fig. 16 is a detail sectional view illustrating the commercial form of the central assembly shown in Figs. 1 and 2. Fig. 17 is a detail sectional view of a further modification of the adjusting means for buckling the assembly.

Like parts are indicated by similar characters of reference throughout the several views.

Referring to the drawings, 1 indicates a conventional steering wheel which may be of any particular design. Some such wheels have four spokes or arms, and some have three flexible cable arms, two of which are disposed in diametrically aligned relation. The arms or spokes 2 of the steering wheel may be of various cross sectional size and shape. Likewise, in some instances the conventional horn button is set either high above the plane of the wheel rim 3 or below such wheel rim plane, or approximately in the plane of the rim.

The present operator mechanism is universally adaptable to various designs of steering wheels with which it is engageable in various positions of rotative adjustment and relative to which it is axially adjustable, including independent adjustment of the horn button contact element relative to the plane of the actuating ring.

In each of the embodiments of the invention illustrated in the drawings the operator device includes an annular ring 4 to which are connected, at circumferentialy spaced intervals, radially disposed lever arms or spokes 5, which are resiliently supported at mid-length points upon a mounting ring 6. The mounting ring 6 is of inverted channel shape, the walls or flanges of which are inturned to form an undercut or gibbed channel to receive adjustable coupling means by which the mounting ring is detachably secured to the steering wheel.

Wire spring anchor members 7 engageable within the channel of the mounting ring 6 are disposed in pairs one on each side of the respective spokes of the steering wheel. Each spring anchor clip 7 is provided at one end with a dependent eye 8 and at its opposite end, which is contiguous to the steering wheel spoke, such spring clip terminates in divergent dependent fingers 9. Intermediate the eye 8 and fingers 9 the spring anchor clip is oppositely bowed for yielding engagement within the inturned flanges of the mounting ring 6 upon which the coupling members 7 are slidingly adjustable. Short helical springs 10 engaged within the eyes 8 of the members 7 extend beneath the corresponding spokes 2 of the steering wheel against the opposite sides of which the dependent fingers 9 abut under contractive tension of the springs 10, which also draw the mounting ring 6 firmly against the steering wheel spokes.

The lever arms 5 and actuator ring 4 carried thereby are yieldingly supported relative to the mounting ring 6 upon helical expansion springs 11 interposed between the mounting ring 6 and the operator lever arms 5 and surrounding an adjustable screw 12 threaded into the mounting ring 6, the head of which limits the outward movement of the lever arms 5 under influence of the springs 11.

Except in the construction shown in Fig. 9, the lever arms 5 are preferably, although not necessarily, of inverted channel form to afford rigidity and strength, although constructed of relatively light weight material. The outer ends of the arms are reversely bent about the operator ring 4 into a flexible or hinge connection as indicated at 13 in Fig. 2. A bushing or sleeve 14 is preferably, although not necessarily, enclosed within the head 13 of the lever arms.

In the particular embodiment of the invention illustrated in Figs. 1 and 2, the inner extremities of the lever arms 5 are formed into tubular or cylindrical tips 15. These reduced terminals on the lever arms extend through circumferentially spaced holes in a cap member 16 into corresponding radial bores 17 in a coupling block 18 adjustably supported within the cap 16 upon a screw stud 19. While the structure thus described comprising the operator ring 4 and radial arms or spokes 5 interconnected at the center within the cap 16 is comparatively rigid and will move as a unit under pressure applied to any point upon the ring 4, the assembly is capable of a buckling adjustment into either convex or concave formation to adjust the central pressure head into operative relation with the steering wheel horn button 20. Axial adjustment of the coupling block 18 in either direction by rotation of the screw stud 19 causes a corresponding unison tilting action of the lever arms 5 about their points of engagement with the walls of the cap 16 as fulcrums. Such adjustment of the arms 5 into inclined relation with the plane of the ring 4, whether above or below such plane, correspondingly adjusts the cap member 16 and coupling block 18 therein. The cap member 16 is preferably provided with a series of tongues or projections 21 on its bottom periphery, which projections are enclosed in rubber sockets 22 which make contact in spaced relation with the top of the steering wheel horn button 20. If the design of the steering wheel is such that the horn button 20 is positioned in elevated relation above the plane of the wheel rim, the coupling block and screw stud 19 are adjusted to tilt the lever arms 5 upwardly into a convex relation of the assembly, the degree of convexity of which will be determined by the relative height of the steering wheel horn button 20. If to the contrary the steering wheel horn button is depressed a substantial distance below the plane of the steering wheel rim, the coupling block 18 within the cap 16 is adjusted downwardly to thereby tilt the lever arms 5 in a reverse direction, causing the assembly to assume a concave contour, the degree of which, as before, is determined by the relative relation of the steering wheel horn button 20. However, whatever degree of adjustment may be effected in order to accommodate the operator structure to the placement of the particular horn button, the assembly will remain comparatively rigid. Depression of the operator ring 4 at any point throughout its periphery will effect a tilting action of the assembly as a whole wherein the elevation of the opposite side thereof will be limited by the head of the screw 12 of one, or sometimes two, of the lever arms or spokes 5, while the force of the leverage incident to the tilting of the operator structure is exerted downwardly against the steering wheel horn button 20 by the rubbersheaved projections or feet 22 of the cap 16.

In the embodiment of the invention illustrated in Figs. 6, 7 and 8 the same relation of operator ring 4, mounting ring 6 and lever arms 5, yieldingly supported upon the ring 6, as before described, is employed. However, in such modified construction the lever arms 5 are formed in detachable telescopically coupled sections. Each lever arm 5 is provided at its inner end contiguous to the central pressure head with a detachable continuation 5a, the ends of which are relatively offset in parallel relation whereby the continuation 5a assumes a substantially compound curvilinear form. The lever arms 5 and their continuations 5a are interchangeably engageable in different rotative relation of the latter. The inward lever continuations 5a may be assembled in either downwardly, laterally or upwardly extending relation as is illustrated in Fig. 7. In the event that the steering wheel horn button is located in depressed relation with the plane of the steering wheel rim, the lever arm continuations 5a are assembled in downwardly offset relation as shown in Fig. 6 and by dot and dash lines in Fig. 7. If to the contrary the horn button is positioned above the plane of the steering wheel rim, the lever arm continuations 5a are reversely assembled in upwardly offset relation as shown by dotted lines in Fig. 7. If, however, the steering wheel horn button is located substantially in the plane of the steering wheel rim or but slightly above or below such plane, such variations of assembly of the inwardly continuing portions 5a of the lever arms 5 afford relatively wide range of adjustment to accommodate steering wheels of radically different design. However, to effect any intermediate adjustment between those afforded by different relative engagement of the lever arm sections, the lever arm assemblies may be varied in their relation with the mounting ring 6 by adjustment of the screws 12 to insure the proper relation of the pressure pads or contacts of the operator head with the horn button.

To afford economical manufacture and easy assembly of the structure in either of its adjustments the central pressure head comprises two telescopic shallow cap members 23 and 24. The outer member 24 is preferably, although not necessarily, of some ornamental character or molded from plastic material whereby it possesses a pleasing appearance. This outer cap member 24 is peripherally notched to accommodate the lever arm extensions 5a. The inner cap member 23, detachably connected with the outer member 24 by a central screw 25, has in its periphery circumferentially spaced bayonet slots 26. The extremities of the lever arm continuations 5a are peripherally grooved at 27 for engagement within the bayonet slots 26. The peripheral grooves form on extremities of the lever arm extension 5a reduced necks and terminal heads 28, which project within the inner cap member 23 and bear against the interior top thereof when in assembled relation. The outer cap member 24 is preferably, although not necessarily, provided with a series of relatively spaced studs or projections which extend through correspondingly spaced holes in the top of the inner cap member 23 and bear upon the steering wheel horn button 20 when the operator is assembled in operative relation therewith.

Any suitable form of telescopic joint may be provided between the sections of the lever arms which will permit their interengagement in alternate positions of relative rotative adjustment. In practice the continuations 5a have been made of polygonal cross section contour and the terminals of the initial sections 5 of the lever arms are provided with corresponding socket recesses to receive the polygonal terminals of the continuations 5a. By removing the central screw 25 the outer ornamental cap 24 may be disengaged from the assembly whereupon the inner cap member 23 may be slightly rotated to disengage the inner ends of the lever arm continuations 5a from the bayonet slots, whereupon the inner cap member 23 may also be removed and thereupon the lever arm continuations 5a may be reassembled in different rotative relation with the lever arms 5 to accommodate the assembly to a steering wheel of different design.

The construction illustrated in Figs. 13 and 13a is somewhat analogous to that last described. In such assembly the inward detachable continuations 5b of the lever arms 5 are engageable therewith in either of reverse positions by means of screws 30. The ends of the lever continuations 5b are offset in substantially parallel relation in much the same manner as the continuations 5a. At their inner extremities, however, the continuations 5b are provided with segmental heads 31, concentrically disposed and adapted to bear directly upon the steering wheel horn button. The segmental heads 31 may engage the horn button independently of each other, or if so desired they may be interconnected into a single annular pressure head, to which may be attached an ornamental cap or button. The assembly of the operator ring 4, lever arms 5 and mounting ring 6 to which the lever arms are yieldingly connected for yielding movement against the tension of the interposed spring 11, is the same as that before described.

In Figs. 9 to 12 inclusive there is disclosed a similar structure having a slightly different mode of operation. This assembly includes the same general arrangement of elements as before, including the tiltable operator ring 4 having engagement with the outer ends of the lever arms 5 yieldingly connected with the mounting ring 6 for oscillation into operative engagement with the steering wheel horn button 20.

However, in the present assembly the several lever arms 5, each of which separately engages with the horn button 20, are independently operable in a contrary relation to the movement of the actuator ring 4. That is to say, as the side of the actuator ring 4 is depressed contiguous to one of the levers 5, the ring engaging end of the lever is elevated to depress the inner end of such lever arm 5, which fulcrums on the screw 12, and thereby exerts operating pressure upon the horn button 20. In such construction the lever arms 5 are positioned coincident with the spokes of the steering wheel. Beneath each lever arm 5 there is provided a channel shaped base member 30 which rests upon the spoke 2 of the steering wheel and is engaged at its inner end about the screw 12 by which the lever arm 5 is connected to the mounting ring 6. Within the channel shaped base member 30, which in turn is enclosed within the inverted channel shaped lever arm 5, is pivoted at 31 a cam lever 32, the arm of which extends beneath the actuator ring 4 and the cam head of which engages with the interior top of the inverted channel shaped lever arm 5. Normally the parts occupy the position shown in Fig. 11. Upon depression of the actuator ring 4, which engages in a vertical slot in the outer end of each of the lever arms 5, the cam lever 32 is oscillated thereby causing an upward camming action of the head of the lever upon the interior of the lever arm 5 as is shown in Fig. 12. This movement causes the outer end of the lever arm 5 to be elevated about its fulcrum upon the head of the screw 12 and the inner end thereof to be forcibly depressed against the horn button 20. As result the horn button may be operated by depression of the operator ring 4 at any point throughout its full circle.

The present invention is capable of embodiment in various forms illustrative of which there is shown in Fig. 15 an alternative mode of attachment of the device to the steering wheel wherein in lieu of the helical spring 10 shown in Fig. 3 there is employed a length of spring wire 33 having therein a mid-length bight 34, the ends of which are engageable in loop shaped keepers 35 slidingly engaged in the inverted channel of the mounting ring 6. The modified form of attachment affords the same degree of adjustability and security before described.

In Fig. 16 there is shown the commercial form of adjusting and contact assembly shown in Figs. 1 and 2, wherein the relatively adjustable members engaged by the spoke ends 15 are drawn from sheet metal, and are provided with an ornamental enclosure cap 36 removably attached by a screw 37 engaging in the head of the adjusting screw 19. The mode of operation and resulting buckling adjustment above or below the plane of the ring is the same as before described.

In the detail view Fig. 17, the inner ends of the arms are shown provided with telescopic extensions 5c similar to the extensions 5a of Figs. 6 and 8, both of which have longitudinal sliding adjustment in the arms 5 to compensate for variation of angularity of the arms. In Fig. 17 the arm extensions are provided with "goose neck" bends 38 which extend through holes 39 in an adjustable plate 40. The extremities of the "goose neck" bends are slightly upwardly inclined and contact the interior top of an enclosure cap 41 which is connected to the plate 40 by an adjusting screw 42. The "goose neck" heads of the arm extensions are formed with lateral shoulders 43 which bear upon the plate 40 and provide fulcrum points for the arm extensions 5c. By relatively adjusting the cap 41 and plate 40, pressure applied to the ends of the "goose neck" extensions cause these members 5c to fulcrum on the shoulders 43 and thereby elevate the outer ends of the extension members 5c and with them the arms 5 and ring 4, the cap being held in contact with the horn button at all times by the attachment of the device to the steering wheel spokes maintains the adjustment and limits the relative movement of the parts.

The embodiment of the invention illustrated in Figs. 1 and 2 and also in Figs. 16 and 17 generally comprises a ring with any plurality of spokes connecting the ring to the central hub in such manner that the assembly is capable of buckling adjustment in alternate directions through the plane of the ring to positions of the hub or contact head above or below the plane of the ring, from which return movement will be resisted. Obviously in such movement, to alternate angular relation, there occurs a shortening and lengthening of the radii, which is compensated by permitting the spokes to slide in and out of the members 16 and 18 in Figs. 1, 2 and 16, and by telescopic adjustment of the extensions 5a and 5c within the arms 5, in Figs. 6, 8 and 17.

In Figs. 9 to 12 and 14 the leverage has been compounded. The compound lever assembly is adjustable to vary the angularity of the operator arms to accommodate the device to different steering wheels by adjustment of the fulcrum screws 12 to vary the height of the fulcrum relative to the horn button and ring. In this case the secondary lever mounting rests upon a spoke of the wheel.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described our invention, we claim:

1. An operator device for a steering wheel signal button including an operator ring to be yieldingly supported substantially concentrically with the steering wheel rim, for universal tilting motion relative thereto, a mounting ring concentric with the operator ring to rest upon the steering wheel spokes, spoke engaging devices slidingly connected with the mounting ring to permit rotative adjustment of the operator assembly relative to the steering wheel, a plurality of radially disposed actuator arms having connection at their outer ends with the operator ring, studs connecting the actuator arms with the mounting ring, springs interposed between the actuator arms and the mounting ring, said actuator arms being responsive to tilting movement of the operator ring to transmit pressure to the signal button of the steering wheel.

2. An operator device for a steering wheel horn button including an operator ring to be yieldingly supported substantially concentric with the steering wheel rim for tilting motion relative thereto, an inverted channel shaped mounting ring adapted to rest upon the steering wheel spokes, a plurality of spring coupling members detachably engageable in the inverted channel of the mounting ring for detachably connecting the mounting ring with the steering wheel spokes, upright studs carried by the mounting ring, actuating levers mounted on said studs and having operative engagement with the operator ring at their outer ends and with the steering wheel horn button at their inner ends.

3. An operator device for a steering wheel horn button including an operator ring yieldingly mounted on the wheel for tilting motion relative thereto, supporting means therefor, radial actuating arms carried by the ring a contact head concentric with the ring and supported by the radial arms for operative engagement with the horn button and adjusting means for buckling the assembly of operator ring and actuator arms to support the contact head in any one of several positions above, below or in the plane of the ring.

4. An operator device for a steering wheel horn button comprising an adjustable assembly including an operator ring and a plurality of radial arms connected with the ring at their outer ends and intercoupled with each other approximately at the center of the ring, and adjusting means for converting the assembly from convex to concave and to plane formation and for retaining the assembly in adjusted condition to accommodate the assembly to differently positioned steering wheel horn buttons and means for yieldingly mounting the assembly on a steering wheel.

5. An operator device for a steering wheel horn button comprising a member to be mounted in concentrically spaced relation with the rim of a steering wheel, with the horn button of which the center of said member contacts including a rim portion and flexibly connected radial spokes and means for yieldingly mounting said member upon a steering wheel, said member being adjustable and so constructed and arranged that it may be buckled into different degrees of concavo convex formation.

6. An operator for a steering wheel horn button including an operator ring, radial arms connected at their outer ends with the ring, a central member in which the inner ends of the arms are fulcrumed, and means for simultaneously oscillating the arms about their fulcrums and holding said arms in their adjusted relation to accommodate said assembly to steering wheels the horn buttons of which are disposed at different elevations, and means for yieldingly mounting the assembly on a steering wheel.

7. An operator for a steering wheel horn button including an operator ring to be mounted in substantially concentric relation with the steering wheel for tilting motion relative thereto, a contact head for engagement with the steering wheel horn button concentrically disposed within the ring, and a plurality of radial arms connecting the ring and contact head, the ends of the arms being offset in approximately parallel relation, said offset portions of the arms being adjustable relative to the ring and contact head into any one of several rotative positions to vary the plane of the contact head relative to that of the ring.

8. An operator for a steering wheel horn button including an operator ring to be mounted in substantially concentric relation with the steering wheel for tilting motion relative thereto, a contact head for engagement with the steering wheel horn button concentrically disposed within the ring, and a plurality of radial arms connecting the ring and contact head, said arms being adjustable relative to the ring to alternate the position of the contact head above and below the plane of the ring to accommodate the device to steering wheels having horn buttons at different elevations.

9. An operator for a steering wheel horn button including an operator ring to be mounted in substantially concentric relation with the steering wheel for tilting motion relative thereto, a contact head for engagement with the steering wheel horn button concentrically disposed within the ring, and a plurality of radial arms connecting the ring and contact head, said arms being bent out of straight formation, at least a portion of each of the arms being rotatively adjustable, the construction and arrangement being such that by adjustment of the arms into different positions of rotative adjustment the contact head may be supported in any one of a plurality of planes relative to that of the ring.

10. An operator for a steering wheel horn button including an operator ring to be mounted in substantially concentric relation with the steering wheel for tilting motion relative thereto, a contact head for engagement with the steering wheel horn button concentrically disposed within the ring, a plurality of radial arms, and a series of eccentric coupling members engageable with the contact head and respective arms in different positions of rotative adjustment to differentially support the contact head in different relation to the ring.

11. An operator for a steering wheel horn button including an operator ring to be mounted in substantially concentric relation with a steering wheel for tilting motion relative thereto, a plurality of radially disposed actuator arms for translating the tilting movement of the ring into pressure upon the horn button, a revolubly adjustable mounting ring of less diameter than the operator ring concentrically disposed rotative adjustment in a parallel plane relative thereto, attachment means for slidingly engaging the mounting ring with the steering wheel to permit such relative rotative adjustment, headed studs carried by the mounting ring upon which the actuator arms are mounted and springs surrounding the studs intermediate the arms and mounting ring.

12. An operator for a steering ring horn button including an operator ring to be mounted in substantially concentric relation with a steering wheel for tilting motion relative thereto, a plurality of radially disposed actuating arms operatively connected with the ring for translating the tilting motion thereof into pressure upon the horn button, a mounting ring of less diameter than the operator ring disposed in concentric parallel relation in a plane offset from that of the ring, upon which the arms are mounted for rocking motion in planes perpendicular to those of the rings, the operator ring being loosely connected with the arms for movement relative thereto and cam members mounted for independent adjustment actuated by the relative movement of the ring for moving the adjacent ends of the corresponding arms in reverse direction.

13. An operator for a steering ring horn button including an operator ring to be mounted in substantially concentric relation with a steering wheel for tilting motion relative thereto, a plurality of radially disposed actuating arms operatively connected with the ring for translating the tilting motion thereof into pressure upon the horn button, a mounting ring of less diameter than the operator ring disposed in concentric parallel relation in a plane offset from that of the ring, upon which the arms are mounted for rocking motion in planes perpendicular to those of the rings, and a series of pivoted auxiliary levers one for each actuating arm mounted for independent adjustment, with one end of each of which the ring engages and the other end of each of which engages with the corresponding actuating arm to transmit reverse movement from the ring to the arm.

14. An operator for a steering ring horn button including an operator ring to be mounted in substantially concentric relation with a steering wheel for tilting motion relative thereto, a plurality of radially disposed actuating arms operatively connected with the ring for translating the tilting motion thereof into pressure upon the horn button, a mounting ring of less diameter than the operator ring disposed in concentric parallel relation in a plane offset from that of the ring, upon which the arms are mounted for rocking motion in planes perpendicular to those of the rings, said ring being mounted for movement relative to the arms and coupling means mounted for relative adjustment for transmitting the movement of the ring in reverse direction to at least one of the arms.

15. An operator for a steering wheel horn button including an operator ring to be mounted substantially concentric with a steering wheel for tilting motion relative thereto, a plurality of radially disposed actuator arms operatively connected with the ring for translating the tilting motion thereof into pressure upon the horn button, a mounting ring of less diameter than the operator ring disposed in concentric parallel relation in a plane offset from that of the operator ring upon which the arms are mounted for movement in directions substantially perpendicular to the planes of the rings upon tilting movement of the operator ring, the arms being offset at their inner ends and at least a portion of each arm being reversable whereby the offset thereof may be reversed to accommodate the device to steering wheels having horn buttons at different elevations.

16. An operator for a steering wheel horn button including an operator ring to be mounted substantially concentric with a steering wheel for tilting motion relative thereto, a plurality of radially disposed actuator arms operatively connected with the ring for translating the tilting motion thereof into pressure upon the horn button, a mounting ring of less diameter than the operator ring disposed in concentric parallel relation in a plane offset from that of the operator ring upon which the arms are mounted for movement in directions substantially perpendicular to the planes of the rings upon tilting movement of the operator ring, said arms being adjustable to different angular relation with the plane of the operator ring to accommodate the device to steering wheels having horn buttons at different elevations.

17. An operator for a steering wheel horn button including an operator ring to be mounted substantially concentric with a steering wheel for tilting motion relative thereto, a plurality of radially disposed actuator arms operatively connected with the ring for translating the tilting motion thereof into pressure upon the horn button, a mounting ring of less diameter than the operator ring disposed in concentric parallel relation in a plane offset from that of the operator ring upon which the arms are mounted for movement in directions substantially perpendicular to the planes of the rings upon tilting movement of the operator ring, and anchor devices for engaging the mounting ring with the steering wheel for concentric rotative adjustment relative thereto.

18. An operator for a steering wheel horn button including an operator ring to be mounted substantially concentric with a steering wheel for tilting motion relative thereto, a plurality of radially disposed actuator arms operatively connected with the ring for translating the tilting motion thereof into pressure upon the horn button, a mounting ring of less diameter than the operator ring disposed in concentric parallel relation in a plane offset from that of the operator ring upon which the arms are mounted for movement in directions substantially perpendicular to the planes of the rings upon tilting movement of the operator ring, and a contact head with which the arms are engaged including a cap member having bayonet slots in its side walls, and heads upon the arms engageable in the bayonet slots.

19. An operator for a steering wheel horn button including an operator ring to be mounted substantially concentric with a steering wheel for tilting motion relative thereto, a plurality of radially disposed actuator arms operatively connected with the ring for translating the tilting motion thereof into pressure upon the horn button, a mounting ring of less diameter than the operator ring disposed in concentric parallel relation in a plane offset from that of the operator ring upon which the arms are mounted for movement in directions substantially perpendicular to the planes of the rings upon tilting movement of the operator ring, and a contact head with which the inner ends of the arms are engaged including an outer cap shaped member having openings in its side walls through which the arms extend and having an axially adjustable inner member within the cap member in which the ends of the arms are seated, and an adjusting means connecting the cap and inner member by adjustment of which the angularity of the arms to a common plane may be varied to accommodate the device to steering wheels having horn buttons at different elevations.

20. In an operator device for a steering wheel horn button—a ring, spokes converging toward the center of the ring, an adjusting means acting on relatively spaced points of the spokes so constructed and arranged as to vary the plane of the inner ends of the spokes in relationship to the plane of the ring.

21. In an operator device for a steering wheel horn button—a ring, spokes converging towards the center of the ring, a concentric contact member connected to the spokes near their point of convergence, an adjusting means acting on relatively spaced points of the spokes to vary the contact member in relation to plane of the ring, said spokes being longitudinally adjustable to compensate for variations of their relative angular adjustment.

22. In an operator device for the horn button on a steering wheel having a rim and radial spokes, a mounting ring for the horn button operator attached to the steering wheel spokes, and anchor means relative to which the mounting ring is capable of adjustment circumferentially to attach it to the spokes of the steering wheel in any one of several rotative positions.

23. In an operator device for the horn button on a steering wheel having a rim and radial spokes, a mounting for a horn button operator and slidingly engaged anchor means for adjustably attaching the operator mounting to the spokes of the steering wheel to enable relative adjustment of the operator mounting into different operative position upon the steering wheel.

GEORGE E. PETERS.
LINUS E. RUSSELL.